US008027964B2

(12) United States Patent
Boulis

(10) Patent No.: US 8,027,964 B2
(45) Date of Patent: Sep. 27, 2011

(54) PERSONALIZED QUERY COMPLETION SUGGESTION

(75) Inventor: Konstantinos Boulis, Seattle, WA (US)

(73) Assignee: Medio Systems, Inc., Seattle, WA (US)

( * ) Notice: Subject to any disclaimer, the term of this patent is extended or adjusted under 35 U.S.C. 154(b) by 500 days.

(21) Appl. No.: 11/777,977

(22) Filed: Jul. 13, 2007

(65) Prior Publication Data

US 2009/0019002 A1    Jan. 15, 2009

(51) Int. Cl.
    G06F 7/00    (2006.01)
(52) U.S. Cl. .................. 707/705; 707/736; 707/737
(58) Field of Classification Search .................. None
    See application file for complete search history.

(56) References Cited

U.S. PATENT DOCUMENTS

| | | | | |
|---|---|---|---|---|
| 5,410,692 | A * | 4/1995 | Torres | 707/3 |
| 6,289,342 | B1 | 9/2001 | Lawrence et al. | |
| 6,647,383 | B1 * | 11/2003 | August et al. | 1/1 |
| 6,708,311 | B1 * | 3/2004 | Berstis | 715/206 |
| 7,185,271 | B2 * | 2/2007 | Lee et al. | 715/226 |
| 7,461,059 | B2 * | 12/2008 | Richardson et al. | 707/5 |
| 7,487,145 | B1 * | 2/2009 | Gibbs et al. | 707/4 |
| 2002/0077808 | A1 * | 6/2002 | Liu et al. | 704/10 |
| 2005/0071328 | A1 * | 3/2005 | Lawrence | 707/3 |
| 2005/0283468 | A1 * | 12/2005 | Kamvar et al. | 707/3 |
| 2006/0004627 | A1 | 1/2006 | Baluja | |
| 2006/0142997 | A1 | 6/2006 | Jakobsen et al. | |
| 2006/0195441 | A1 * | 8/2006 | Julia et al. | 707/5 |
| 2007/0088686 | A1 * | 4/2007 | Hurst-Hiller et al. | 707/4 |
| 2007/0192318 | A1 * | 8/2007 | Ramer et al. | 707/7 |
| 2010/0070484 | A1 * | 3/2010 | Kraft et al. | 707/706 |
| 2010/0121876 | A1 * | 5/2010 | Simpson et al. | 707/769 |

FOREIGN PATENT DOCUMENTS

WO    WO02/33527 A2    4/2002

OTHER PUBLICATIONS

Cucerzan, Silviu, et al. "Spelling correction as an iterative process that exploits the collective knowledge of web users", *Proceedings of the 2004 Conference on Empirical Methods in Natural Language Processing* (2004) pp. 293-300.

* cited by examiner

*Primary Examiner* — Wilson Lee
*Assistant Examiner* — Jessica N Le
(74) *Attorney, Agent, or Firm* — Kilpatrick Townsend & Stockton LLP

(57) ABSTRACT

Search query processing includes receiving a search query input string from a user of a mobile device and comparing the search query input to a personalized dictionary of the mobile device, determining a suggested completion for each match in the comparison, and providing the suggested completion to the user for selection. The user can select the suggested modification, if desired, and the completed query can be submitted to a search facility. Personalized dictionaries can be generated from analysis of previously submitted search queries. The analyzed search queries may have been submitted by the user, as well as by other users with similar interests. The analysis of search queries may categorize users into clusters or groups of persons having similar interests.

28 Claims, 6 Drawing Sheets

PERSONALIZED QUERY COMPLETION SUGGESTION

BACKGROUND

Search applications, such as Internet search engines and mobile navigation systems, receive user input that includes search terms for desired information on locales or destinations and the like. The search applications return search results that are responsive to the search terms and that should contain the desired information. The more desirable search applications assist users in finding the information they seek more accurately and more quickly. Providing a response more quickly is especially important in the mobile environment, where the user input interface is often relatively small, cumbersome, and slow, and where users are often engaged in multiple tasks that compete for attention.

One technique for assisting the user input process is to provide suggested input completion. For example, many mobile navigation systems offer suggested city name and street name completions as a user types the input letters. The system suggestions are based on the received letters, which comprise a text string that can be compared against a database of valid city names and street names. The most likely valid names are offered to the user as suggested completions for the input string. The user is free to accept a suggested completion, or to continue with providing text input letter-by-letter until the user completes the input string. As the user types additional letters, the system may continue to offer name completion suggestions until the user submits an input string.

Query completion is also known for Internet search engines in the mobile context. As a user types letters comprising search terms into an input display box, the mobile search engine application may offer suggested terms (letters and/or words) that would be valid completions to the search query. For example, if a mobile user begins typing into a search engine input box and completes the text string "resta . . . ", the search engine may select the word "restaurant" from its database and offer the word to the user as a suggested completion for the query text. If the user selects the suggested completion, the search engine will use the accepted completion text in the search. If the user wants to keep typing the input, the user can do so. In either case, the search engine will operate on the search input phrase submitted by the user.

The database relied upon for providing suggested search terms is typically a list of several hundred or perhaps one thousand popular terms. The list of popular terms comprises a query lexicon or dictionary that the search engine can use to compare against already-received letters and terms in a query input to identify the most likely search query completion. The query dictionary is typically downloaded from the search engine server and stored at the user's mobile device, rather than kept only at the search engine server. Downloads can occur periodically according to a schedule or can occur whenever a change to the dictionary is available, or both. Such local storage of the completion database provides faster response time and reduced bandwidth requirements as compared with server-based dictionary storage.

Unfortunately, users may often provide search terms that are not found among the popular terms in standard dictionaries, and therefore the search engine system cannot find meaningful completion suggestions from the database. That is, the completion suggestions are more likely to be rejected by the user. As a result, the user must manually complete the search input string. Search terms that are not found in the local search dictionary represent lost opportunities for assisting the user with more quickly completing the query and receiving useful responses. In addition, when the acceptance rate of completion suggestions is reduced because no meaningful completions are offered, some users may come to suspect that a carrier or search provider is skewing the search terms offered or is attempting to influence the submitted searches for their own purposes, rather than to assist the user. Such suspicions lead to user dissatisfaction, much in the way that non-targeted advertising can have a negative impact on consumers.

Although more valid completion suggestions can be obtained with a larger search dictionary that would have more terms available for suggestions, the increased dictionary size would tax the local data storage capacities of most mobile devices. Thus, increasing the local dictionary size sufficiently to include most of the terms a user might input would be impractical. The search engine server has significant storage capacity for large dictionaries and could be the repository for a larger mobile completion suggestion database, but forcing mobile devices to obtain completion suggestion from the server would significantly increase the response time, defeating the purpose of completion suggestion, and would consume too much system bandwidth. Thus, server-based completion suggestion would be an unsatisfactory user experience and would be inefficient.

It should be apparent that more efficient schemes for providing search engine query input for mobile devices are desired. The present invention satisfies this need.

SUMMARY

In accordance with embodiments described herein, suggestions for completion of an input query as a user provides query input are based on a dictionary that is specially selected for the user. The dictionary on which completion suggestions are based comprises a personalized dictionary that is specially selected for the user, and in that way the query completion suggestions are personalized for the user. When each query completion suggestion is offered to a user, the suggestion comprises a suggested modification to the input string received thus far from the user, based on comparison of the input string to entries in the personalized dictionary. If the user accepts the offered completion suggestion, then the input query string is modified in accordance with the completion suggestion. The completion suggestions can be provided for an input string already completed or in the process of being input. The personalized query completion suggestion is more likely to provide completion suggestions that are appropriate for the user as compared with systems that utilize the same dictionary for all users. That is, the query completion suggestion from the personalized dictionary is more likely to be what was intended by the user and will more likely be welcomed and trusted by the user. This increases the efficiency of the user input process and improves the user experience. In this way, user acceptance rates of completion suggestions are increased and resource utilization is not compromised.

Embodiments described herein support search query processing that includes receiving a search query input string from a user of a mobile device and comparing the search query input to a personalized dictionary and determining a suggested completion for each match in the comparison, and then providing the suggested completion to the user for selection. The input string can be received from the user via, for example, the device keyboard. The received input string can comprise a single letter or a group of letters or a phrase. Likewise, the modification may be a single letter or a group of letters or a phrase. The user can then select the suggested input query completion or modification, if desired. The completed query can be submitted to a search facility for return of search results.

Embodiments provide personalized dictionaries that can be generated from analysis of previously submitted search queries. The analyzed search queries may have been submitted by a user population comprising the target user (the user for whom the personalized dictionary is intended), as well as by other users or exclusively by other user populations. Typically, a target user who is new to the search system or service will be provided with a personalized dictionary constructed from user queries by a user population with similar interests to those of the target user. The analysis of search queries may determine clusters or groups having similar interests. The clusters or groups may be identified based on information such as user interests or characteristics, and on information about the search queries themselves, such as search terms, or based on combinations of such information and categories. Target users can be placed or assigned into more than one cluster or group. The personalized dictionary provided to a target user will be fashioned according to the groups with which the target user has been identified. Thus, a target user's personalized dictionary may be a combination of multiple group-specific dictionaries. The personalized dictionary can be stored at the target user's mobile device for efficient utilization of resources.

Other features and advantages of the present invention should be apparent from the following description of exemplary embodiments, which illustrate, by way of example, aspects of the invention.

DETAILED DESCRIPTION

Figure 1:
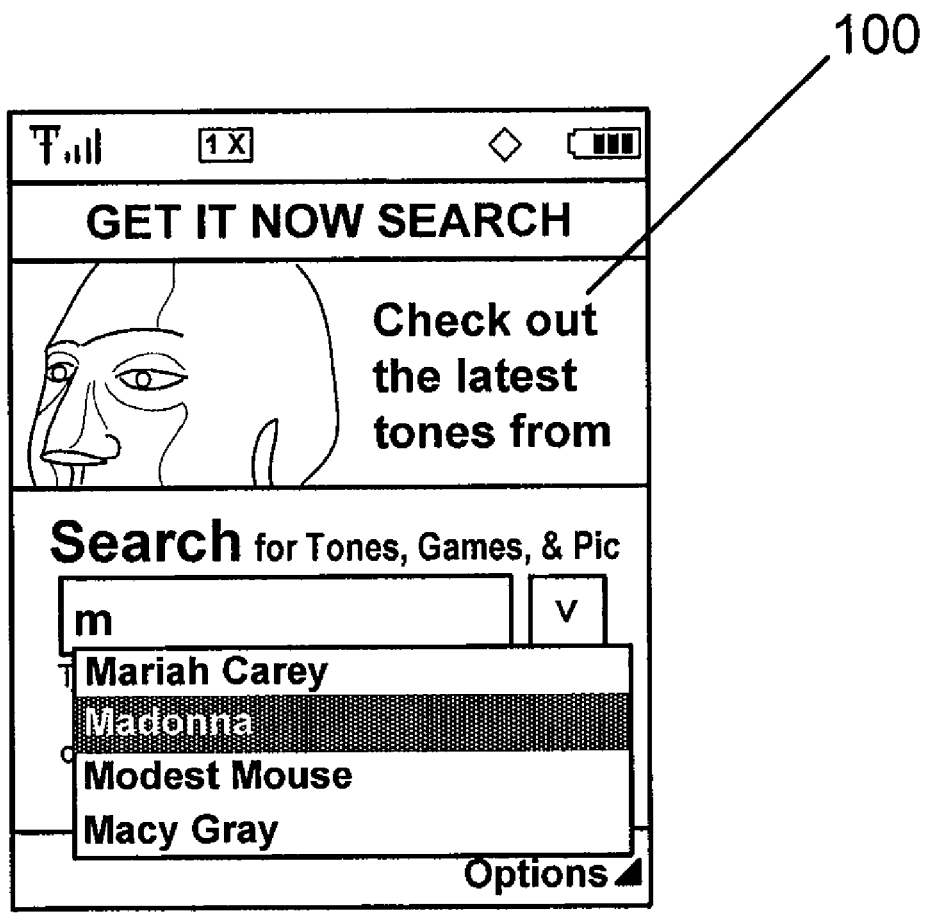
FIG. 1 is an illustration of a mobile device display showing a query input and suggested completion in accordance with the description.

Embodiments described herein help users find the information they want faster with the help of a personalized query completion suggestion feature in conjunction with search engines. Using a lexicon that is tailored for a user, rather than using the same lexicon for all users, more quickly provides a query completion suggestion, and provides a suggestion that is more likely the completion intended by the user as the complete query. References in this description to "Medio Systems" shall be understood to be references to the assignee of the present invention, Medio Systems, Inc. of Seattle, Wash., USA. Numbered headings in this description are provided for the convenience of the reader.

1.0 Summary

Aiding users to more quickly find the information they seek is an important goal of a successful search application. This is especially true in a mobile environment where input mechanisms are typically cumbersome and slow. For example, most users in a mobile environment are typing on a relatively small keyboard and may be engaged in multiple tasks so that typing on a keyboard can only be given intermittent attention. Such users highly value assistance with their input of commands and search terms.

Conventional query suggestion completion systems are not personalized to the preferences of each user. Rather, a single list of 200-1000 popular items is created and the same list is then passed to every system user. When the user starts typing a query, a list of one or more of the most probable completion (s) are shown to the user and the user has the option to select a completion suggestion. But user preferences are diverse and what would be popular in one group of people would not necessarily be popular in another group. This one-size-fits-all approach can result in lower suggestion acceptance rates and also may result in lower overall user satisfaction, since it can lead a user to believe that the carrier is pushing content of the carrier's choice. The same reasons why non-targeted advertising can be not only ineffective but actually detrimental are applicable for a non-targeted query completion suggestion system.

In accordance with the description herein, user profiles are created by accumulating all the search queries submitted by users in a population. The user population may comprise, for example, all the subscribers to an access (telecommunications) service, or the accumulated search queries may comprise all search queries submitted over a carrier's network over a specified time interval, or all search queries submitted by users in a particular locale over a particular time. Other specifications for accumulations of search queries and user populations for creating the user profiles will occur to those skilled in the art. The collected user search queries are used to define user affinity, i.e. how similar are two users in their preferences and interests. Thus, user groups or clusters are defined over the search queries of the user population. By creating groups of users with similar preferences, a query completion suggestion dictionary for each group can be created. All the users belonging in the same group (i.e., placed or assigned in the same group or groups) may use the same group-specific dictionary rather than using one dictionary created for the entire user population. A target user is a user for whom a personalized dictionary is to be generated, and the personalized dictionary for each target user can be generated in accordance with the target user's group membership. If a target user belongs to multiple groups, that target user's personalized dictionary may comprise a combination of the group-specific dictionaries for the groups to which the target user belongs.

Personalized query suggestion as described herein can greatly reduce the number of characters that must be typed before a searchable query input is constituted. For example, it is anticipated that users can avoid typing 30%-50% of the characters they would otherwise need to type with a non-personalized conventional search system. This can be a very desirable reduction in input strokes that makes utilization of search applications much more attractive, especially in the context of searching with mobile devices such as Web-enabled cellular phones or WiFi devices.

2.0 Personalized Query Completion Suggestion

FIG. 1 shows a display page 100 of a mobile device with an example of query completion suggestion in accordance with an embodiment of the invention. The illustrated display shows query completion suggestion as the target user is typing a query. For example, in FIG. 1, the user has typed the letter "m" as the first letter in a query and a drop-down box appears with a number of possible completions. The suggested completions shown in FIG. 1 include "Mariah Carey", "Madonna", "Modest Mouse", and "Macy Gray". Thus, query completion suggestions are provided to the user in real time as the user types a query input.

Suggesting query completions as the user is typing a query input is a popular feature in most Web search engines (see for example http://labs.google.com/suggest). Suggesting query completions in mobile search, where input mechanisms are typically cumbersome and slow, is of even greater importance than in desktop search. Making query completion suggestion as accurate as possible, thereby reducing the number of characters a user must type before completing a query input, is especially important in mobile search. In accordance with the present invention, one way to achieve more accurate query completions is through personalization of search dictionaries. A personalized system, especially one that learns the preferences of a particular user over time, should offer more accurate query completions than a non-personalized system.

For example, "mariah carey" is currently a very popular search query among mobile users overall, but there are many users that are not interested in this artist. Seeing "mariah carey" as the query completion suggestion every time the user types "m" or "ma" is not only less accurate for those users, but can also lead to lower user satisfaction. The user may be more likely to believe that the carrier is pushing content of the carrier's choice, is more likely to see the query completion suggestion as a promotion, and is therefore less likely to continue using the completion suggestion application. If, on the other hand, the completion suggestions are targeted to the user, then the user will likely view them less as a promotion and more as a convenient feature that can help them find information they are looking for faster.

An important premise of personalized query completion suggestion is that it enables different people to see different suggestions based on their preferences. For example, assume that there are two users, one who likes pop music and celebrity culture, and the other whose interests are disposed to classical music (both of these groups do exist, according to analysis of the received query logs). Using the personalized query completion suggested described herein, when these two users start typing the same characters for a search, they will see different results. The two different completion suggestion results are illustrated in FIG. 2.

Figure 2:
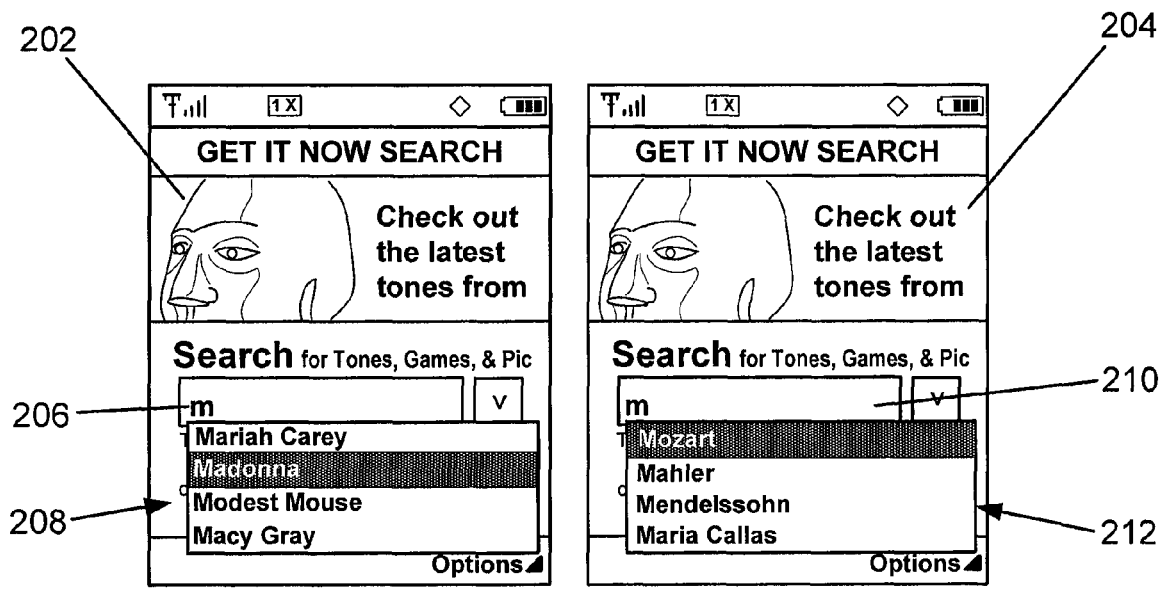
FIG. 2 is an illustration of displays for two mobile devices, each display showing a query input and suggested completion for the two respective different users.

FIG. 2 shows that, in personalized query suggestion, different target users can be provided with different suggestions, depending on their respective preferences. In the left mobile device display 202, a target user has typed "m" as a search query input into an input window 206, and is shown a list 208 of suggested query completions for "m" comprising "Mariah Carey", "Madonna", "Modest Mouse", and "Macy Gray". These names are produced with a personalized dictionary for a target user who is in a group categorized as interested in music of popular culture. The names are all common in currently popular culture. In the right mobile device display 204, a different target user has typed "m" as a search query input into an input window 210, and is shown a list 212 of suggested query completions for "m" comprising "Mozart", "Mahler", "Mendelssohn", and "Maria Callas". These names are produced with a personalized dictionary for a target user who is in a group categorized as interested in classical music. The names are all associated with classical music composers and performers. These two respective target users may select a query completion from their respective choices 202, 204 and the selected completed query can be submitted to a search facility. After search processing, the search facility can return identified search results.

A more successful query completion suggestion system has the advantage that fewer queries coming to a vendor's servers will need to be checked for spelling correction and normalization, improving system efficiency and freeing up vendor resources for other tasks.

It should be noted that personalization is not mere memorization (which is often called customization in other contexts). As will be shown in the discussion below, simply memorizing past searches of a user is not a successful strategy. Rather, the full promise of personalization as described herein lies in the fact that inferences can be made about the latent preferences of a user based on his/her search history. The personalized search dictionaries described herein are generated based on data related to prior searches conducted by users in the same group, possibly including the very user for whom the dictionary is personalized. The personalized query completion suggestion system as described herein can suggest query completions that comprise queries that have not been issued before by the user but that are still pertinent to his/her interests.

2.1 Risks of Personalized Query Suggestion

Potential risks of personalized query completion suggestion are no different than the potential risks of any personalization system. If the suggestions are too narrow or too user-specific, even if they are accurate, they may be perceived as intrusive and may raise privacy concerns by the user. On the other hand, care must be taken not to "pigeonhole" a user and show inaccurate completion suggestions. Both of these concerns can be addressed, at least partially, with the techniques described further below. Also, with personalized query completion suggestion, the Quality Assurance (QA) effort of the dictionary provider increases, since now there will be multiple dictionaries rather than one for all users.

Query completion suggestion with personalized dictionaries is most useful in an environment where there are many groups of users with distinct preferences that remain substantially stable over time. An ideal environment for using a personalized dictionary in conjunction with a search facility is for a content store, such as the retail sales environment in which music compositions can be purchased, including full songs and ringtones for mobile devices (e.g. telephones). Other environments, such as general purpose Web search, or where time and/or location of search are crucial factors, might be improved but generally might not benefit as greatly.

Currently, the Google™ search service does not deploy personalized query completion suggestion on "Google Suggest", citing privacy reasons (see, e.g., http://labs.google-.com/suggestfaq.html at item 9) although it apparently has the ability to suggest queries based on one's search history with a Google User Account and Web access (see the explanation at the URL of www.qooqle.com/historv/ then click on "Interesting Items" on the left side of the screen).

3.0 System Architecture

In the exemplary system described herein, a personalized query completion suggestion system is configured to operate with mobile devices such as cellular telephones that are Web-enabled, Personal Digital Assistants (PDAs), "smart phones", and the like. An exemplary system is illustrated in FIG. 3.

Figure 3:
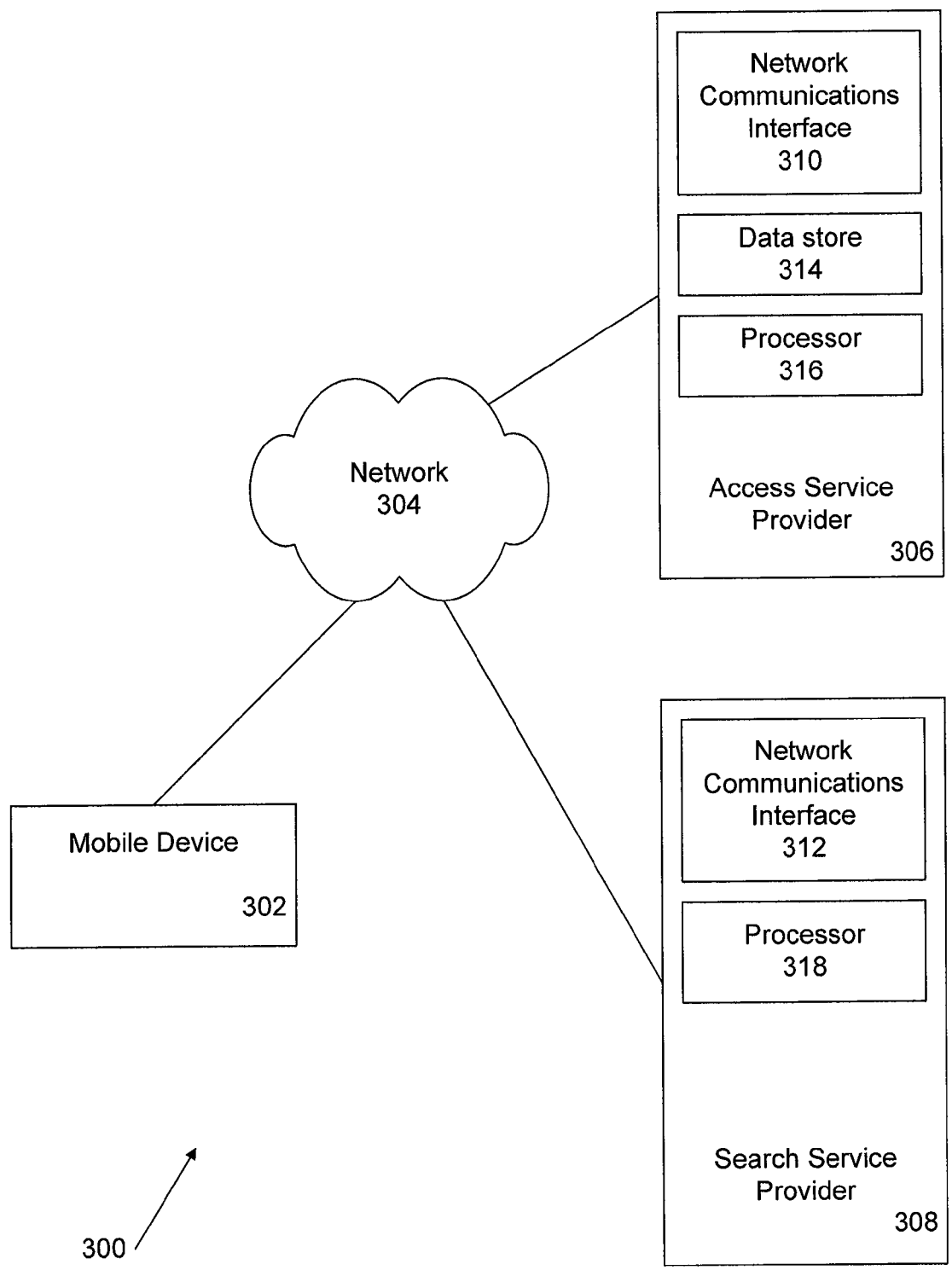
FIG. 3 is a block diagram of a mobile device communication system that operates in accordance with the description.

FIG. 3 shows a mobile device communication system 300 that includes mobile devices 302, such as may include Web-enabled cellular telephones, smart phones, PDAs, and the like. The mobile devices communicate over a network 304, such as the mobile device carrier network, through which the mobile devices also gain access to Web content and the like. An access service provider 306 provides network access to the mobile devices and a search service provider 308 provides search services to users of the mobile devices. The access service and search service may be provided by separate vendors or by the same vendor, and their respective services may be provided by different facilities or the same facility. Users of the mobile devices 302 comprise subscribers to the access service provider 306. A subscription or other access agreement with the search service provider may be necessary. An example of an access service provider 306 is Verizon Wireless®, and an exemplary search service provider 308 is Medio Systems, the assignee of the present invention. The access service provider 306 and the search service provider 308 are adapted for network communications with the mobile devices 302 and each other through respective network communications interfaces 310, 312.

The access service provider 306 authorizes and manages access by the mobile devices 302 to Web content from the Internet 304 over the service provider's network. As such, the access provider can receive information concerning search queries submitted by each mobile device user and can assemble such information into data that relates to the collective search activities of the users. A processor 314 of the access provider accumulates the collective information in a data store 316. The access provider can provide such data to the search service provider 308, or can arrange for the search service provider to gain access to such query information directly from subscribers. The search service provider can comprise an entity that receives submitted search queries over the network 304, such as searches for Web content, and processes the searches to locate the requested content and return the information to the submitting user. The user who submitted the search query is then free to select the located content. Thus, the search provider 308 has sufficient processing, such as computers, network interface equipment, data storage, and the like, to receive search requests, process the requests, and return links to the located content.

The search service provider 308 analyzes the search query information and produces personalized dictionaries. The search service provider develops categorizations (groups) based on the collected search query information and other available information, such as subscriber and user demographic information and generalized search query data, to produce the personalized dictionaries. The search service provider generates the personalized dictionaries using a processor 318. In the illustrated system 300, the personalized search dictionaries are installed at each mobile device 302 such that the installed dictionary is personalized for a target user (e.g., a subscriber) who is associated with the device. That is, a "target user" is a user for whom a personalized dictionary is generated, and a target user is not necessarily a member of the user population whose search queries were used to define the groups and generate the group dictionaries. Each personalized dictionary can be provided from the search service provider 308 to the corresponding user 302 over the network 304. For example, the personalized dictionaries can be provided in the course of regular updates from the service provider, or from download requested by the user (subscriber), or other provider-subscriber communications, as desired.

Figure 4:
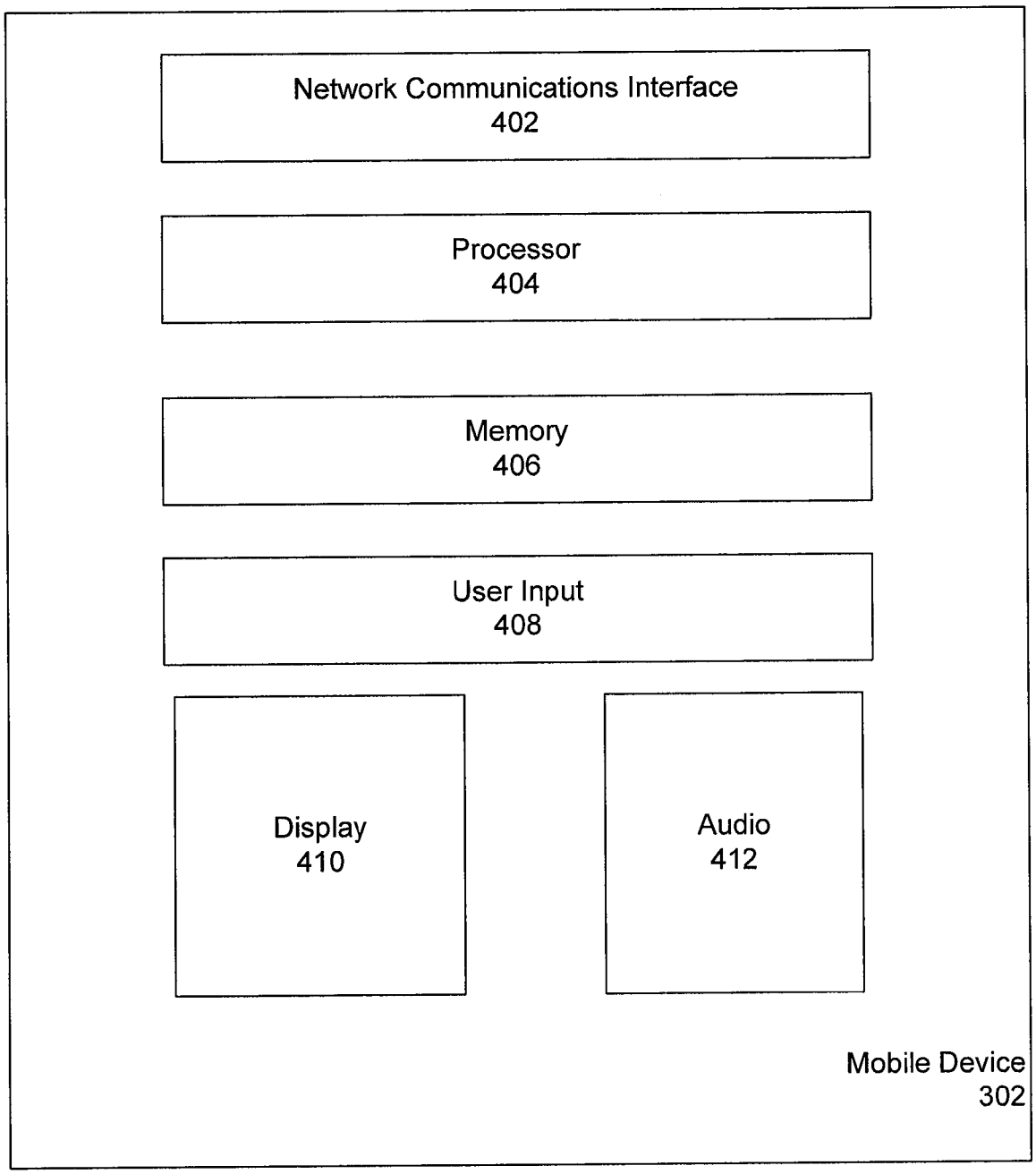
FIG. 4 is a block diagram of the mobile device illustrated in FIG. 3.

FIG. 4 is a block diagram of a mobile device 400 such as the devices 302 used in the FIG. 3 system. The mobile device 400 includes a network communications interface 402 through which the mobile device communicates with the network 304 (FIG. 3). A processor 404 controls operations of the mobile device. The processor comprises computer processing circuitry and is typically implemented as one or more integrated circuit chips and associated components. The mobile device includes a memory 406, into which the personalized dictionary can be stored for use with a search application that is executed from the mobile device. A user input component 408 is the mechanism through which a user can provide controls and data. The user input component can comprise, for example, a keyboard or numeric pad or other input mechanism for providing user control and data input. A display 410 provides visual (graphic) output display and an audio component 412 provides audible output for the mobile device.

4.0 System Operation

Figure 5:
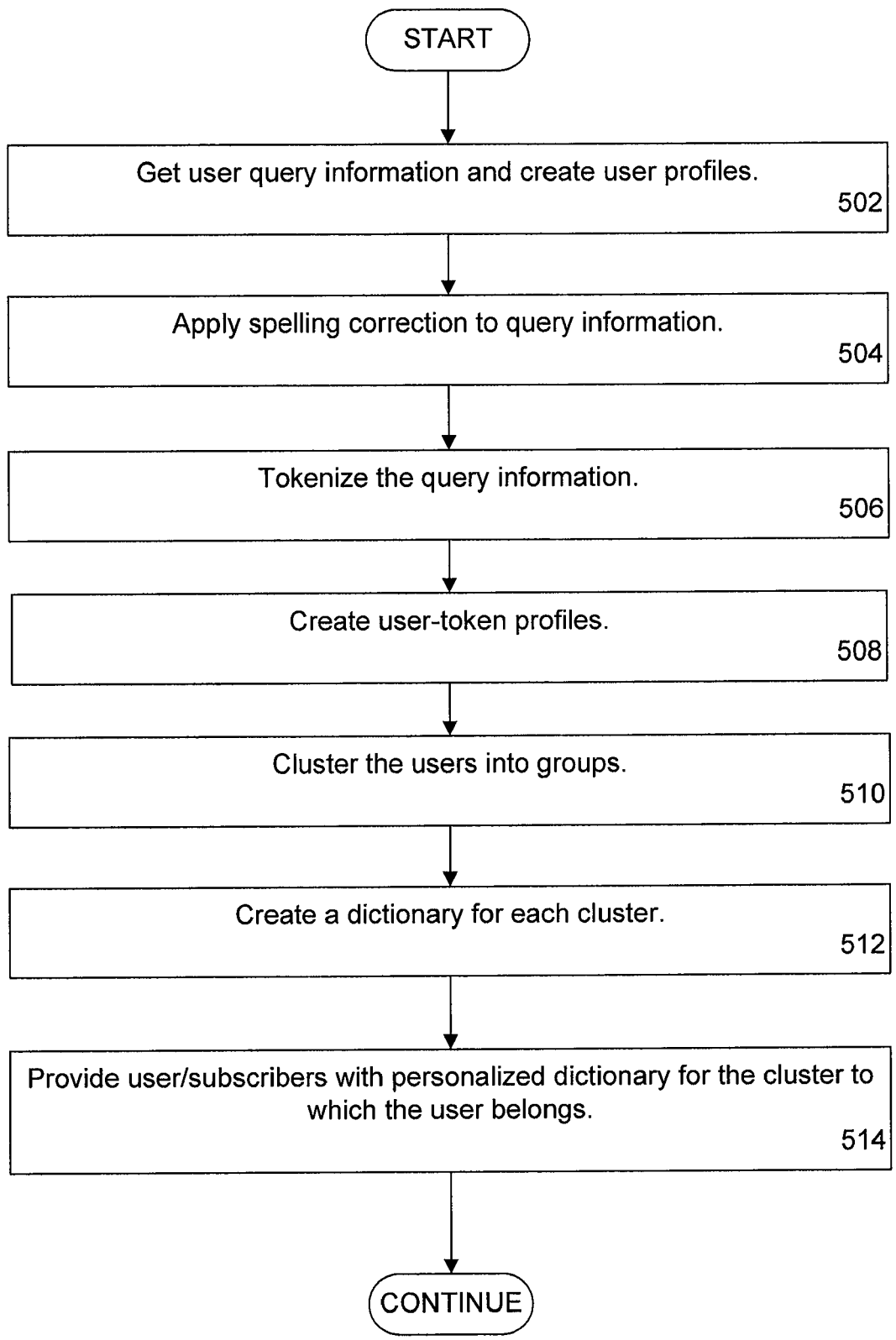
FIG. 5 is a flow chart that illustrates processing to generate a personalized dictionary in accordance with the description.

FIG. 5 illustrates the operations performed in the FIG. 3 system for generating a personalized dictionary in accordance with the invention. The first operation, represented by the diagram box numbered 502, is to obtain raw user-query data profiles. The data profiles are typically derived from search query logs, such as obtained from the access service provider. The information may be kept in a data warehouse or other depository, to which a search service provider or the like may gain access. The user-query profiles are created containing the raw search queries entered by a user population over a period of time. For example, the raw user-query profiles may contain information that indicates users and corresponding search queries over a time period for each indicated user in the user population. The user-query profile information may be updated on a regular basis or otherwise kept current for each user.

The next operation, indicated by box 504, is to apply spelling correction. That is, the raw queries can be passed through a spelling correction system. Spelling correction can more efficiently manage the data, by eliminating spurious duplicate entries. If no spelling rules exist in the system, the spelling rules can be automatically generated from the raw query logs and spelling dictionaries. If desired, the system can store incorrect spellings, such that correction indexes can be improved for spelling correction.

The next operation is to tokenize the queries (box 506). In this operation, search query terms are combined or parsed into tokens and token sequences comprising letters and identifiable words. That is, after spelling correction, the processed search queries comprise a collection of words that can be useful for query completion suggestion, but it is desirable to offer completion suggestions that comprise complete phrases, not just single words. For example, a query of "britney spears" comprises the words "britney" and "spears", but these two words will be merged into the single token of "britney spears" by the tokenization process of block 506. Other tokens that can be substituted for individual words could include movie titles, names of musical groups, song titles, business names, place names, and the like. Additional details regarding exemplary tokenization processing are provided below.

After tokenizing the user-query information, the next operation (box 508) is to create user-token profiles. In this operation, the tokenized queries are substituted into the query history to obtain new profiles. That is, in the raw user-query profiles that contain search queries for corresponding users, this operation replaces the search queries with the tokenized search query information from box 506.

At the next operation of box 510, one or more clusters or groups are defined, and a target user can be placed in one or more of the groups as described further below, on the basis of preferences as indicated by processing the search queries (that is, the tokenized search queries). The search information can also be supplemented with additional information about users. For example, clustering a user population into groups can be based on search queries in conjunction with demographic information obtained from carriers or from self-reporting by persons in a user population or by target users, or a combination. The granularity of the clustering can be selected in accordance with interests gleaned from the search query information and in consideration of system resources and the capabilities of the mobile devices intended for application. Conventional techniques can be used for identifying clusters from among the query information. For example, various threshold levels may be used to determine when the frequency of search queries directed to particular terms warrants a new cluster for the corresponding subject category. In addition, devices with relatively limited resources and processing power might be limited to personalized dictionaries of restricted size or the group memberships associated with the device might be limited. Further details regarding clustering are provided below. The clustering identifies groups of users with similar preferences.

At box 512, a dictionary is created for each identified cluster, or user group. The tokenized query information of all the users whose search queries contributed to a cluster are used to create one dictionary per cluster. Those skilled in the art will be familiar with creating dictionaries based on a set of search query information. In accordance with the present invention, a group of such dictionaries is created, one per cluster, based on search query information of each identified cluster. A target user who does not have a sufficient prior query search history to generate a reliable personalized search dictionary, such as a new user, can be placed into one of the identified clusters on the basis of self-selection, or account information, or a default group, or the like. After the target user receives the personalized dictionary and submits searches, thereby building a search log, that target user can contribute to the search log data and contribute to future processes that define the clusters and produce the cluster dictionaries.

At the last operation 514, each target user will be provided with the personalized dictionary for the cluster or group in which the user is categorized. If the target user is a member of more than one group, as described further below, the target user can be provided with a personalized dictionary that is a combination of the dictionaries for each cluster or group in which the target user is categorized. The personalized dictionary can be provided to the target user through network access. For example, the user can download the personalized dictionary in accordance with update procedures of the carrier through which the user obtains network access. The personalized dictionary is installed into the target user's mobile device and is automatically employed by the mobile device when the user makes use of a search application to input a query. No change is necessary to the operation of the mobile device for utilizing the personalized dictionary produced in accordance with the invention.

To the user of the mobile device in the system, there is no change to the device operation necessary to utilize the personalized dictionary as described herein. Therefore, when a user begins typing a query into a search query input window for a search application of the mobile device, the search application will consult the personalized search dictionary stored in the device memory and will generate one or more suggestions for completion or modification of the search query based on the personalized dictionary as the user inputs the query. The suggestions can be shown in a drop-down list of the application display, such as illustrated in FIG. 1 and FIG. 2. The user can then designate one of the completion suggestions to use as a completion of the user query being input to the search application. The query thus modified is then submitted to the search query facility.

As noted above, it is possible for a user to belong to multiple clusters, or groups. For a user who has sufficient search log data, the categorization of that user as between multiple group memberships will depend on whether the frequency of individual search terms input by the user indicates that the user has interests that correspond to more than one group. When multiple groups are indicated, the combination of group-specific search dictionaries can be combined to generate a personalized search dictionary by applying different weights to the group-specific dictionaries, in accordance with the user's search query information. That is, in the case of multiple groups, a target user can be provided with a weighted dictionary according to that user's particular, individual search query information. For each group dictionary, tokens are sorted according to their frequency in that cluster (group). If a target user belongs to multiple clusters or groups, then a personalized dictionary can be generated by weighting the frequency of each token in a cluster with the membership of the target user to that cluster, and adding the weights over all clusters. Thus, each token will be associated with a weight, according to the target user's group memberships.

For example, in one scenario, it may be that four group dictionaries have been generated from search query data. The exemplary group dictionaries are provided below in Tables 1, 2, 3, and 4, comprising respective categorizations called Cluster 1, Cluster 2, Cluster 3, and Cluster 4. Each of the tables shows two columns, one for search query terms and the other with corresponding frequency counts in the search query data for the listed terms:

TABLE 1

| Cluster 1 | Count |
|---|---|
| family guy | 8837 |
| south park | 3901 |
| games | 1649 |
| simpsons | 1084 |
| star wars | 999 |
| ringtones | 981 |
| eminem | 907 |
| tones | 902 |

TABLE 2

| Cluster 2 | Count |
|---|---|
| bob marley | 4870 |
| sublime | 3892 |
| jay z | 2080 |
| nas | 1706 |
| eminem | 1626 |
| ringtones | 1609 |
| akon | 1606 |
| snoop dogg | 1471 |

TABLE 3

| Cluster 3 | Count |
|---|---|
| disney | 5841 |
| wallpaper | 1192 |
| tones | 1097 |
| games | 872 |
| ringtones | 833 |
| pix | 721 |
| pirates | 619 |
| mickey mouse | 468 |

TABLE 4

| Cluster 4 | Count |
| --- | --- |
| country | 10147 |
| tim mcgraw | 5493 |
| kenny chesney | 5106 |
| rascal flats | 4416 |
| tones | 4138 |
| ringtones | 3980 |
| nickelback | 3889 |
| keith urban | 3145 |

Those skilled in the art will understand probabilistic and statistical methods that may be used to derive group memberships for individual users of a user population. For example, well-known techniques using mixture-of-multinomials methods and the like may be used. Such methods can determine that, for example, User A has a 0.8 likelihood measure for membership in Cluster 1 and 0.2 for membership in Cluster 3. In this example, User A has zero membership in Cluster 2 and Cluster 4. With these example values, the personalized dictionary for User A will have a count frequency given by count=(0.8*count in Cluster 1)+(0 for Cluster 2)+
(0.2*count in Cluster 3)+(0 for Cluster 4), so that the count frequency in the User A personalized dictionary for the term "games" will be (0.8*1649)+(0.2*872) =1493.6.

After the personalized dictionary is generated and installed at the mobile device of the target user, every time the target user starts typing a search query, the top query completion suggestion in the list presented to the user will be the entry in the personalized dictionary that starts with the same characters as typed by the user and has the highest frequency count. The second completion suggestion in the list will be the entry in the personalized dictionary that starts with the same characters as typed and has the second highest frequency count, and so on. The completion suggestion list will change as the target user types an input query, in accordance with matching the letters typed thus far and ordering according to the frequency count for terms in the personalized dictionary.

To provide the personalized dictionary for User A, the Cluster 1 and Cluster 3 dictionaries can be combined so as to provide an integrated dictionary with the computation above. For example, in the User A personalized dictionary, the term "games" will have a corresponding entry in the frequency column of 1493 (integer value). Thus, generating the personalized dictionary in the case of multiple group memberships will involve some computation of frequency count data from the constituent group dictionaries. The personalized dictionary will be stored at the User A device in place of the generic dictionary that would otherwise be stored in the User A mobile device. As noted above, the operation of the user's search application with the personalized dictionary will be transparent to the user.

5.0 Creating User Profiles

An exemplary description of producing personalized dictionaries in accordance with the invention is described below. The personalized dictionaries can be completed using collective search query information from a population of subscribers.

The first operation for creating groups of users with similar preferences is to define a profile for each user. Since we are seeking to generate query completion suggestions for search queries, logs of completed search queries can be used to define or identify user profiles from the population of users. The data from the population can be processed so as to use the most likely valid search queries as the basis for identifying groups and fashioning dictionaries. For example, all users with five or more different valid queries can be selected for further processing, and search queries from users with fewer queries can be deleted from the data to be further processed. In order for a particular query to be considered valid, it must be issued (i.e., submitted) by at least ten other users and must not be comprised solely of punctuation marks. Other "qualifying" measures can be used to include or exclude data and provide useful dictionaries, in accordance with system requirements.

The query logs from which the groups are identified and dictionaries are generated can be taken from actual search support system data, such as from search systems available from Medio Systems for telecommunications providers. In general, the search data will be collected over a selected time period from a selected telecommunication service (e.g. cellular telephone service) provider. The choice of a threshold of five queries per user for inclusion in the data, as described above, is an arbitrary value that should be sufficient for satisfactory results for most systems. Nevertheless, it should be noted that, in general, care must be taken to ensure that users selected for inclusion in the search query population have sufficient user history (i.e., a sufficient number of different valid queries) for group definition and personalization to be effective.

A user profile contains all the queries the user has issued or submitted, along with a count of the number of times each query has been issued by that user. For example, a profile can be similar to the following:

3163905 "games" 2 "sean paul" 3 "free games" 3 "free" 1 "dance dance revolution" 3

The user profile immediately above can be interpreted as: user 3163905 has queried two times for "games", three times for "sean paul", three times for "free games", once for "free", and three times for "dance dance revolution".

5.1 Spelling Correction

After the user profiles have been defined, based on search query data from users who meet the minimum threshold of five valid queries, the profiles can contain a significant amount of spelling errors. Spelling errors can be viewed as noise, masking the true preferences and intentions of users. In addition, when dictionaries are created, no misspelled words should appear as suggestions. Therefore, the user profiles should be checked and any spelling errors should be corrected. The spelling correction process can comprise, for example, the spelling correction system provided by vendors such as Medio Systems. Such spelling correction systems often closely follow the techniques described in S. Cucerzan and E. Brill, "Spelling correction as an iterative process that exploits the collective knowledge of web users" cited above, and which is incorporated herein.

To briefly explain the spelling correction process, tokens and token pairs are extracted from the queries of the user profiles. A token is defined as a string of one or more characters (including punctuation) separated from other tokens by a whitespace or a tab. In one embodiment, the Levenshtein string edit distance is calculated between every pair of extracted tokens/token pairs. String edit distances are calculated between every token, every token pair, and between every single token and token pair. The string edit distances can be normalized, so that normalized string edit distance is defined as the total number of insertion, addition, and deletion operations needed to transform one string into a reference string, divided by the number of words in the reference string, where the reference string is defined to be the string that is more frequent, according to the query search logs. If the string edit distance is lower than 0.2, then the pair should be retained in the user profile.

String edit distance cannot tell which token is the reference, so the string with the highest number of occurrences is assumed to be the reference. Only tokens that are not part of a predefined list are allowed to be corrected. The spelling mapping errors are chained together to recognize transitive relations, so if "A maps to B" and "B maps to C", only the "A maps to C" rule is kept. For a comparison of this approach to other spelling correction schemes, see the Cucerzan and Brill document referenced above. After the spelling rules are created, they can be applied to every query in the user profiles. It can be expected that a large fraction of spelling mistakes can be corrected. For example, approximately one-fourth of unique queries and 5%-10% of total queries can be expected to be corrected for misspellings.

5.2 Tokenizing Queries

After the spelling correction process is completed, it is not unusual to have a relatively high number of queries in relation to the number of users. For example, the number of unique queries can be one-half the number of total users in the search submitting population. Many carriers have hundreds of thousands of users. Query data of this volume can hamper effective statistical modeling. In addition, many queries can express similar intentions. For example, "britney spears", "rt britney spears", and "britney spears ringtones" can all express very similar intentions. To reduce the high dimensionality of the user query space, the queries can be broken up into constituent tokens and corresponding tokenized queries can be generated.

Since retaining names and named entities in the data can improve the generated dictionaries, trigger pairs of size 2, 3, and 4 can be constructed. A trigger pair is a pair of tokens, where the presence of one causes (or triggers) with high probability the presence of the other. For example "Christina Aguilera" is a trigger pair since when "Aguilera" is present in a query, the data indicated that the previous word is almost always "Christina". Or "Don Omar" is another trigger pair since when "Don" is present, "Omar" is most likely the next word. Trigger pairs can have any length we choose. In the exemplary system, the maximum trigger pair length is set to four.

For a sequence of tokens to be considered a trigger pair, two conditions are generally required: (a) the support or the probability of one token given the others must exceed 0.8, and (b) the total number of occurrences for the sequence must be greater than 50. Some examples of likely trigger pairs in currently available data are: "lord of the rings", "Winnie the pooh", "somewhere over the rainbow", and the like. In the context of music, artist and band names are typical trigger pairs, along with popular song titles. Using the tokenization approach described herein, queries that contain the same tokens but in different order will not be treated as distinct entities. That is, queries that have the same tokens but in different order will be treated as the same query. For example, the queries "ringtones britney spears" and "britney spears ringtones" will be treated as identical. Also, by using tokens instead of words, "britney spears" will be a single token, rather than two tokens. This leads to better user-to-user affinity estimates The tokenization process can drastically reduce the number of terms in the search query data, on the order of a reduction to 10% to 20% of the tokens after tokenization as compared to before tokenization.

5.3 Create User-Token Profiles

After the tokenized queries are generated, the next operation in producing a personalized dictionary is to create user-token profiles. The user-token profiles are created by substituting a tokenized query into the user profile collection of submitted queries. That is, a tokenized query is substituted for a raw query, thereby reducing the number of tokens or different queries in the user space.

6.0 Creating Group-Specific Dictionaries

6.1 Clustering Users Into Groups

After user-token profiles are created, the next step is to cluster the users into substantially homogeneous groups. Determining the number of groups and the data composition of the groups will depend on system design priorities and user profile data characteristics, such as continuous or discrete, binary or mixed, and the like. Some alternative techniques include agglomerative clustering and k-means clustering. For the exemplary system described herein, a mixture of multinomial distributions with appropriate smoothing is fitted on the user profile data. Other considerations will be known to those skilled in the art.

The modeling assumption with the multinomial processing is that each homogeneous group of users corresponds to a different multinomial distribution. This model is fit to the data using the Expectation-Maximization framework known to those skilled in the art. The outcome of this process is a vector for each user containing the fractional memberships for each group or cluster. The model permits a user to fractionally belong to multiple clusters. Details of the clustering method will be known to those skilled in the art. It should be apparent that people have diverse interests, and aggregating all queries into a single dictionary would ignore this fact. In accordance with the invention, the diverse interests of a search query population is recognized and reflected in the group-specific dictionaries.

6.2 Creating a Dictionary for Each Cluster

The next operation is to create a dictionary for each cluster. The profiles from all the users belonging to the same cluster are aggregated (if a user fractionally belongs to a cluster, the profile is first multiplied by that fraction) and the frequency of each token occurring in the queries belonging to a cluster is estimated. In this way, the frequency of each query in a cluster is estimated. If desired, the tokens can be edited to eliminate unwanted terms, such as offensive terms or prohibited terms. In addition, terms or tokens for which the search application will not likely return any meaningful results can be removed, such as the names of Web domains. Dictionaries should return a result for every suggested query completion. Therefore, terms that are not likely to provide a valid result should be removed before the dictionaries are generated. Also, tokens with less than five occurrences per cluster can be removed, and this will also likely remove a significant part of tokens that do not return any meaningful result. Thus, a portion of the collective search query information can be excluded from the analysis that includes tokenizing.

To control the number of tokens for each dictionary, a pruning process is applied. Each token is ranked according to its number of occurrences in that cluster and the top N tokens are retained. The value of N can be selected in accordance with system resources and the intended application (e.g., mobile device capabilities).

Figure 6:
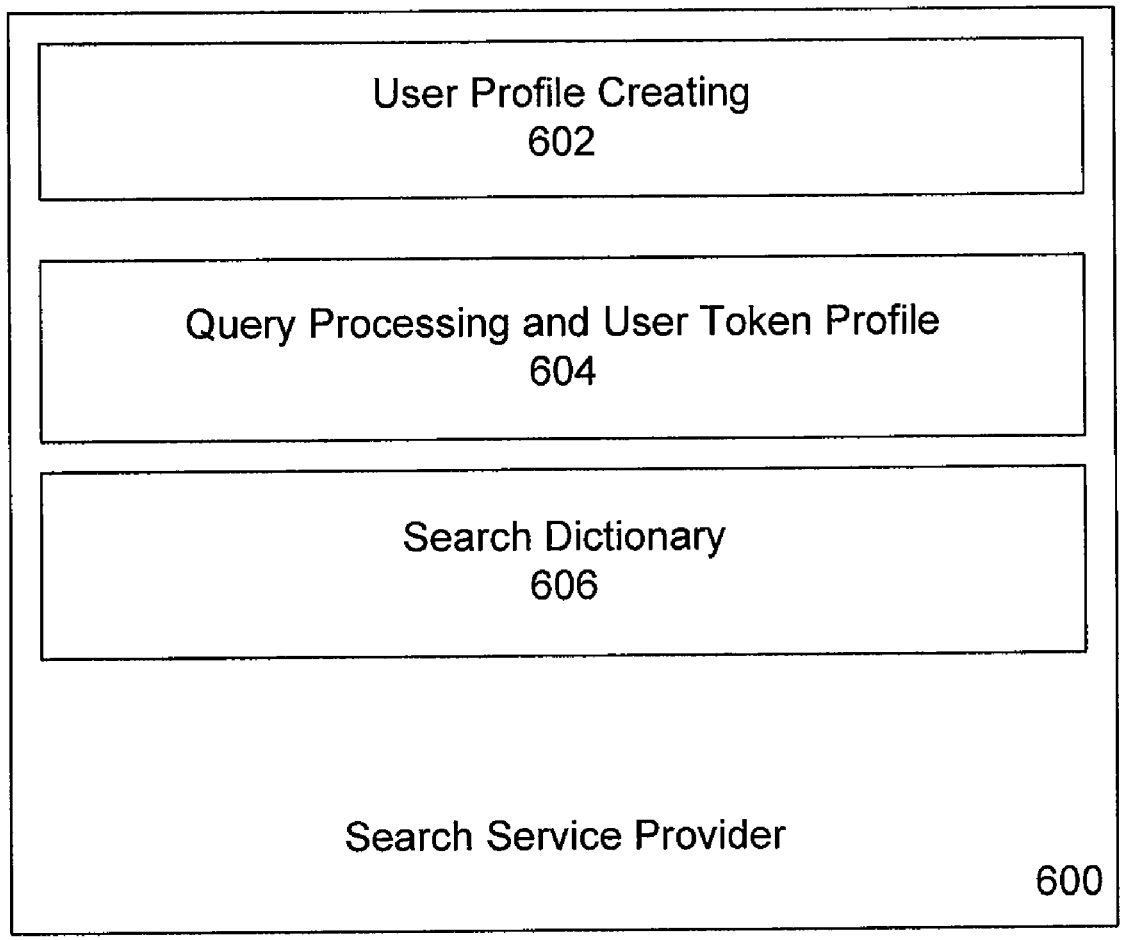
FIG. 6 is a block diagram of a search service provider that generates the personalized dictionaries in accordance with the description.

FIG. 6 is a block diagram of processing components 600 in a computer of a search service provider that generates personalized dictionaries in accordance with the disclosure herein. The components may be implemented in software or a combination of software and hardware (e.g. firmware) for operation by the processor 318 of the search service provider 308 illustrated in FIG. 3.

The processing components include a User Profile Creating component 602. This component performs the operations described for creating user profiles, such as the operations of the box 502 of FIG. 5. The User Profile Creating component performs the analysis of collective search query information at predetermined intervals on updated collective search query information. Also included is a Query Processing and User Token Profile component 604. This component performs query information processing, such as spelling correction, query tokenizing, and creation of user-token profiles (see, e.g., box 504, 506, 508 of FIG. 5 and corresponding description above). The processing components also include a Search Dictionary component 606 that clusters the users into groups, produces a dictionary for each cluster or group, and generates the personalized dictionary that a target user should receive. The processing of this component 606 corresponds to the operations of box 510, 512, and 514 of FIG. 5.

7.0 Prediction Issues

Evaluation in a production system can be realized through monitoring the suggestion acceptance rates. Each query contains a bit indicating if it came from a suggestion or not. To properly validate that personalized query suggestion is better than non-personalized, we should apply an A/B test where a randomly selected user group receives a non-personalized dictionary and another randomly selected group uses personalized dictionaries. The suggestion acceptance rate of the second group should be higher. It should be noted that in both cases equal size dictionaries must be used.

Alternative embodiments can be provided for the personalized query completion suggestion technique described thus far. The main task is the ability of the disclosed system to deliver different dictionaries to different users. This is a server-side functionality and should be a prerequisite for any personalization effort. No changes should need to be made to the client side operation for successful operation. Once the dictionary is loaded onto a rich client, it will be processed the exact same way as before. Also, no changes need to be made to the indexing process since this is not a personalized search feature.

In many cases, there likely will be some effort required from the Quality Assurance (QA) department for successful implementation, since the dictionaries need to provide confidence that: (a) There are no adult, offensive or otherwise inappropriate terms in any of the dictionaries, (b) There are no completion suggestions in any of the dictionaries that do not return a result. Such QA assurances can be provided by a combination of excluding a portion of the collective query information from analysis (such as excluding offensive and inappropriate search terms) and processing the generated personalized dictionaries before delivery (such as eliminating completion suggestions).

Also, dictionaries should be updated regularly (perhaps once a week) and so should the user memberships in the various clusters. This process can be automated for greatest efficiency. Thus, the search provider can regularly revise membership in the cluster groups and can regularly regenerate the personalized dictionaries based on the new collected search query data being received. The updates can incorporate new data from search query logs to include new search query data and new users. Thus, a target user can contribute to the search query logs from which user profiles are created and group dictionaries are produced. In this way, the system described herein can learn the preferences of the target user and provide more useful query completion suggestions.

8.0 Conclusions

Helping users find what they want faster, especially on a mobile device, is crucial for improved user satisfaction. A proof-of-concept personalized query completion suggestion system was detailed and quantitative results were shown. The results are very encouraging and show that using a personalized query completion suggestion system can result in significant savings in typing time compared to a non-personalized system. An important point to take is that the suggested personalized query completion suggestion system is not a mere memorization system. Simply memorizing the previous searches of a user and applying these for query completion suggestion usually results in poor savings. The key component is to place each user into a larger context, but still narrow enough that it is useful, and this is what clustering in accordance with the invention does. It should be noted that clustering is not the only choice of statistical machinery that can achieve personalization. Other methods and techniques can also be used, such as factor analysis, but the improvement between other statistical methods and cluster-based personalization is not likely to be more significant than the improvement between using cluster-based personalization and no personalization.

The same principle behind the personalized query completion suggestion system described herein can be applied to other areas of the search experience, namely personalized voice search, personalized recommendations, and generating personalized item popularity.

Thus, a personalized search dictionary is a search dictionary generated for a particular target user, according to a user profile for that user. The user profile may be created by analysis of search queries by that target person in relation to a user population, or the user profile may be created by assigning the target user to a group, or to one or more groups in a collection of groups, based on demographics, self-reporting, self-selection, questionnaire, and so forth. That is, the target user is the user for whom the personalized dictionary is to be generated. For each defined group, a corresponding group search dictionary is produced. The group search dictionaries are produced in accordance with search queries submitted by users in a user population. A target user may or may not be a member of the user population from which the personalized dictionary is generated. In fact, at initial sign-up, the target user is most likely not a member of the search query user population, because the target user is new (to the system) and does not likely have sufficient search queries to contribute to the search query data. The target user is not necessarily a person, but is associated with a user account maintained by the service provider and through whom (or through which) the personalized search dictionary is provided and the search queries are submitted.

The dictionary generating technique described herein can provide a personalized dictionary that is tailored for a target user so that the personalized dictionary includes terms that have greater relevance to the target user's likely search queries and can therefore likely provide a more useful query completion suggestion. Because the personalized dictionary is tailored for the target user, terms that are not likely relevant to the user can be deleted or excluded from the personalized dictionary, producing a more user-relevant dictionary that can provide a user experience comparable to that of much larger general-purpose completion dictionaries that are shared across larger user populations. The personalized dictionary described herein can be reduced in size as compared with the size of a comparable general-purpose dictionary. The reduced size makes it more likely that the personalized dictionary can be accommodated in storage of devices having relatively modest resources. Thus, the personalized dictionary can be stored in memory of a mobile device so that it can be readily accessed by a search application without the necessity of communicating with a general-purpose dictionary that is stored at a remote network location. Once it is available to the mobile device user, the personalized dictionary can be coupled to a search application of the mobile device to provide query completion suggestions, as described herein.

As described herein, in accordance with the personalized query completion suggestion and personalized lexicon, the query completion suggestion is more likely to be what was intended by the user and will more likely be welcomed and trusted by the user. This is especially useful in the mobile device context, where speed of input and efficiency of operation are highly prized. The technique has application to a wide variety of devices, and is especially suited to mobile devices such as smart cell telephones with mobile Web capability and other mobile Web-enabled devices such as WiFi-capable devices. The technique has application to a variety of input mechanisms, such as alphanumeric input from conventional keyboards and also voice input.

The present invention has been described above in terms of a presently preferred embodiment so that an understanding of the present invention can be conveyed. There are, however, many configurations for mobile enterprise data systems not specifically described herein but with which the present invention is applicable. The present invention should therefore not be seen as limited to the particular embodiments described herein, but rather, it should be understood that the present invention has wide applicability with respect to mobile enterprise data systems generally. All modifications, variations, or equivalent arrangements and implementations that are within the scope of the attached claims should therefore be considered within the scope of the invention.

I claim:

1. A computer system for generating a personalized search dictionary for query completion suggestion, the system comprising:
    a user profile creating component comprising a processor of the computer system configured to perform analysis of raw search query information for each user of a user population and creates a user profile for each user, wherein the user profile identifies the user and corresponding raw search queries submitted by the identified user over a period of time;
    a query processing and user token profile component comprising a processor of the computer system configured to process the user profiles and perform query information processing, including spelling correction, query tokenizing, and creation of user-token profiles, in which search query terms of the raw search queries in each of the user profiles from the user profile creating component are parsed into tokens comprising letters and identifiable words and a user-token profile corresponding to each user profile is created comprising the raw search queries replaced with the tokenized search queries;
    a search dictionary component comprising a processor of the computer system for defining one or more groups based on the user-token profiles wherein each user of the user population is assigned to one or more of the defined groups, wherein each defined group comprises a collection of users that are indicated by frequency of the tokenized search queries as having similar preferences and generates a search dictionary for each defined group in accordance with the tokenized search queries of the users in the corresponding defined group;
    wherein the search dictionary component generates a personalized search dictionary for the user in accordance with data submitted by a predetermined user population over a period of time wherein the personalized search dictionary provides the user with query completion suggestions that are configured to be submitted to a search facility in response to being accepted by the user.

2. The system as in claim 1, wherein the search dictionary component assigns a target user into one or more of the identified groups and generates a personalized search dictionary in accordance with the assigned groups and search dictionaries for the target user.

3. The system as in claim 2, wherein the personalized search dictionary is configured to be installed and operate in a mobile device.

4. The system as in claim 2, wherein the search dictionary component generates the personalized search dictionary from analysis of collective search query information that includes data related to search queries submitted by a predetermined user population over a period of time.

5. The system as in claim 4, wherein the collective search query information includes data related to search queries submitted by the user over a period of time.

6. The system as in claim 4, wherein the target user is not a member of the predetermined user population.

7. The system as in claim 4, wherein the user profile creating component performs the analysis of collective search query information by identifying a plurality of previously submitted search queries of a population of search users, determining groups of the search users based on the previously submitted search queries, and generating a group search dictionary for each one of the determined groups.

8. The system as in claim 7, wherein the target user is placed into one or more of the determined groups, and the personalized search dictionary is generated according to the user membership to each determined group into which the target user is placed.

9. The system as in claim 2, wherein the analysis of collective search query information is repeated at predetermined intervals on updated collective search query information.

10. The system as in claim 2, wherein the user profile creating component performs the analysis of collective search query information at predetermined intervals on updated collective search query information.

11. The system as in claim 2, wherein the query processing and user token profile component excludes a portion of the collective search query information from the query information processing.

12. The system as in claim 2, wherein the query processing and user token profile component performs tokenizing by identifying trigger pairs in the user profiles.

13. The system as in claim 2, wherein the personalized search dictionary component determines the personalized search dictionary that the target user should receive.

14. The system as in claim 2, wherein the personalized search dictionary is generated from among a predetermined set of group search dictionaries.

15. A method of generating a personalized search dictionary at a search service computer for query completion suggestion at a computing device, the method comprising:
    creating a user profile at the search service computer for each user of a user population, each user profile identifying a user and corresponding raw search queries submitted by the identified user over a period of time;
    tokenizing the user profiles, performing query information processing, including spelling correction, query tokenizing, and creating user-token profiles at the search service computer, in which search query terms of the raw search queries in each of the user profiles are parsed into tokens comprising letters and identifiable words and a user-token profile corresponding to each user profile is created comprising the raw search queries replaced with the tokenized search queries;

defining one or more groups based on the user-token profiles wherein each user of the user population is assigned to one or more of the defined groups, wherein each defined group comprises a collection of users that are indicated by frequency of the tokenized search queries as having similar preferences;

creating a group-specific search dictionary at the search service computer for each defined group in accordance with the tokenized search queries of the users in the corresponding defined group;

generating a personalized search dictionary for the user in accordance with data submitted by a predetermined user population over a period of time, wherein the personalized search dictionary provides the user with query completion suggestions that are configured to be submitted to a search facility in response to being accepted by the user.

16. The method as in claim 15, further including:
assigning a target user to one or more of the defined groups;
providing the target user with a personalized search dictionary in accordance with the one or more defined groups to which the target user is assigned.

17. The method as in claim 15, wherein the target user is a member of the user population.

18. The method as in claim 15, wherein a portion of the collective search query information is excluded from the tokenizing.

19. The method as in claim 15, wherein tokenizing includes identifying trigger pairs in the user profiles.

20. The method as in claim 15, wherein the personalized search dictionary is generated from analysis of collective search query information that includes data related to search queries submitted by a predetermined user population over a period of time.

21. The method as in claim 20, wherein the collective search query information includes data related to search queries submitted by the target user over a period of time.

22. The method as in claim 20, wherein the target user is not a member of the predetermined user population.

23. The method as in claim 20, wherein the analysis of collective search query information comprises:
identifying a plurality of previously submitted search queries of a population of search users;
determining groups of the search users based on the previously submitted search queries;
generating a group search dictionary for each one of the determined groups.

24. The method as in claim 23, wherein the target user is placed into one or more of the determined groups, and the personalized search dictionary is generated according to the user membership to each determined group into which the target user is placed.

25. The method as in claim 24, wherein the personalized search dictionary is configured to be installed and operate in a mobile device.

26. The method as in claim 20, wherein the analysis of collective search query information is repeated at predetermined intervals on updated collective search query information.

27. The method as in claim 15, further comprising:
generating a personalized search dictionary, wherein the personalized search dictionary comprises at least one group dictionary selected from among a plurality of group dictionaries, each of which is associated with a user group and is produced from search query information from a user population comprising multiple users, wherein the personalized search dictionary includes a group dictionary associated with each user group with which the user is identified.

28. The system as in claim 1, wherein the search dictionary component further generates a personalized search dictionary, wherein the personalized search dictionary comprises at least one group dictionary selected from among a plurality of group dictionaries, each of which is associated with a user group and is produced from search query information from a user population comprising multiple users, wherein the personalized search dictionary includes a group dictionary associated with each user group with which the user is identified.

* * * * *